United States Patent
Turner et al.

(10) Patent No.: US 12,437,096 B2
(45) Date of Patent: Oct. 7, 2025

(54) HIGHLY DISTRIBUTED, CRYPTOGRAPHIC-BASED DATA STORAGE METHOD

(71) Applicant: Xinsere Inc., San Francisco, CA (US)

(72) Inventors: Mark Turner, Altadena, CA (US); Jeremy A. Katz, Jenkintown, PA (US); Joshua M. Katz, San Francisco, CA (US)

(73) Assignee: XINSERE INC., San Francisco, CA (US)

(*) Notice: Subject to any disclaimer, the term of this patent is extended or adjusted under 35 U.S.C. 154(b) by 216 days.

(21) Appl. No.: 18/063,303

(22) Filed: Dec. 8, 2022

(65) Prior Publication Data

US 2023/0177198 A1 Jun. 8, 2023

Related U.S. Application Data

(60) Provisional application No. 63/287,462, filed on Dec. 8, 2021.

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC ..... G06F 21/6218; G06F 21/602; G06F 21/64
See application file for complete search history.

(56) References Cited

U.S. PATENT DOCUMENTS

| 2014/0337393 | A1  | 11/2014 | Burchall et al. |
| 2019/0288850 | A1* | 9/2019  | Beecham ............ G06F 21/6209 |
| 2019/0349433 | A1  | 11/2019 | Smith et al. |
| 2020/0007342 | A1* | 1/2020  | Liem .................... H04L 9/0643 |
| 2020/0186602 | A1  | 6/2020  | Leshinsky et al. |
| 2022/0374537 | A1* | 11/2022 | Lindemann ............... H04L 9/50 |

OTHER PUBLICATIONS

International Search Report and Written Opinion mailed Jun. 29, 2023, from International Application No. PCT/US2022/052243, 10 pages.

* cited by examiner

*Primary Examiner* — Azizul Choudhury
(74) *Attorney, Agent, or Firm* — Meunier Carlin & Curfman LLC

(57) ABSTRACT

Distributed Permissioned Data (DPD) network to securely store encrypted data by distributing multiple copies of data fragments in resilient nodes in the network. Data fragments are stored in multiple node chains in the network. Storing data in this distributed fashion offsets conditions where some nodes are not available because they are offline or unreachable. Nodes may also have other constraints placed on them, such as bandwidth utilization, storage limits, and CPU allocation. Multiple versions (replicas) of the data fragments are stored in multiple nodes to provide resiliency. By properly selecting a number of data fragments and a number of replicas, data stored in the network will be highly available.

21 Claims, 10 Drawing Sheets

HIGHLY DISTRIBUTED, CRYPTOGRAPHIC-BASED DATA STORAGE METHOD

CROSS-REFERENCE TO RELATED APPLICATION

This application claims priority to U.S. Provisional Patent Application No. 63/287,462, filed Dec. 8, 2021, entitled "HIGHLY DISTRIBUTED, CRYPTOGRAPHIC-BASED DATA STORAGE METHOD," the disclosure of which is expressly incorporated herein by reference in its entirety.

BACKGROUND

Prior systems and methods for networked storage of data files operate like traditional file servers. In these systems, complete copies of data files are stored in folders much like they are on a local hard drive. To provide redundancy, copies of the data files are replicated or backed-up to other systems. To secure the data files, either client-side or server-side encryption may be used and measures may be taken to prevent unauthorized access to systems. However, while traditional systems are able to provide resilience by making multiple copies of data files, they introduce security vulnerabilities as each copy creates an additional point of exposure as each storage instance has a complete copy of the data file. The need exists for certain types of data to have additional data resilience and additional native security.

SUMMARY

The present disclosure is directed to an architecture to securely store encoded data which can be encrypted or non-encrypted by distributing multiple copies of data fragments in nodes in a resilient network. Data fragments are stored in multiple node chains in the network. Storing data in this distributed fashion offsets conditions where some nodes are not available because they are offline or unreachable. Nodes may also have other constraints placed on them, such as bandwidth utilization, storage limits, and CPU allocation. Multiple versions (replicas) of the data fragments may be stored in multiple nodes or node chains to provide resiliency. By properly selecting a number of data fragments and a number of replicas, data stored in the network will be highly available in case some nodes are unavailable or offline.

In an aspect, breaking up the encoded data in data fragments provides an extra layer of security because no one node has a complete data file, nor can it reconstitute an entire data payload. If any single node is compromised, it cannot deliver the entire payload nor a route map to the entire payload.

In another aspect, an owner of the data can impose access permissions on their data to limit access to specific parties, organizations, individuals, groups, or any other category of users that may be contemplated. The data owner can permission itself to receive copies of the data back from the network or apply time-bound permissions to enable other parties to access the data. An owner of the data can also impose restrictions on where the data payload can be delivered. Validation of the access permissions and the delivery location for the data may be recorded on a distributed ledger (e.g., blockchain) or indeed on the network itself. The use of the blockchain or distributed ledger for such immutable permissions binds trust between the permissions and the distributed data. In accordance with aspects of the disclosure, permissions can be fine grained to whole organizations, teams or even individuals by connecting to user authentication services.

In yet another aspect, the system writes data to the network in such a way that encoded data is securely confirmed as present on the network in compliance with an SLA and with ongoing data integrity checking. The system reads data from a network of nodes to reconstitute the original data in a bit-perfect way and deliver it to a recipient location. The location can be written to the distributed ledger as part of the bonded trust.

In yet another aspect, a network service or services can be used in the system to manage the nodes, balance traffic between the nodes, hold IP addresses or other routing information, the node IDs for the first node in each Node Chain, and other network information as may be needed. These network services can be implemented in one or multiple regions to provide resilience and performance. The network services can be implemented in several possible configurations, including writing its data as a set of nodes in the distributed system itself.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
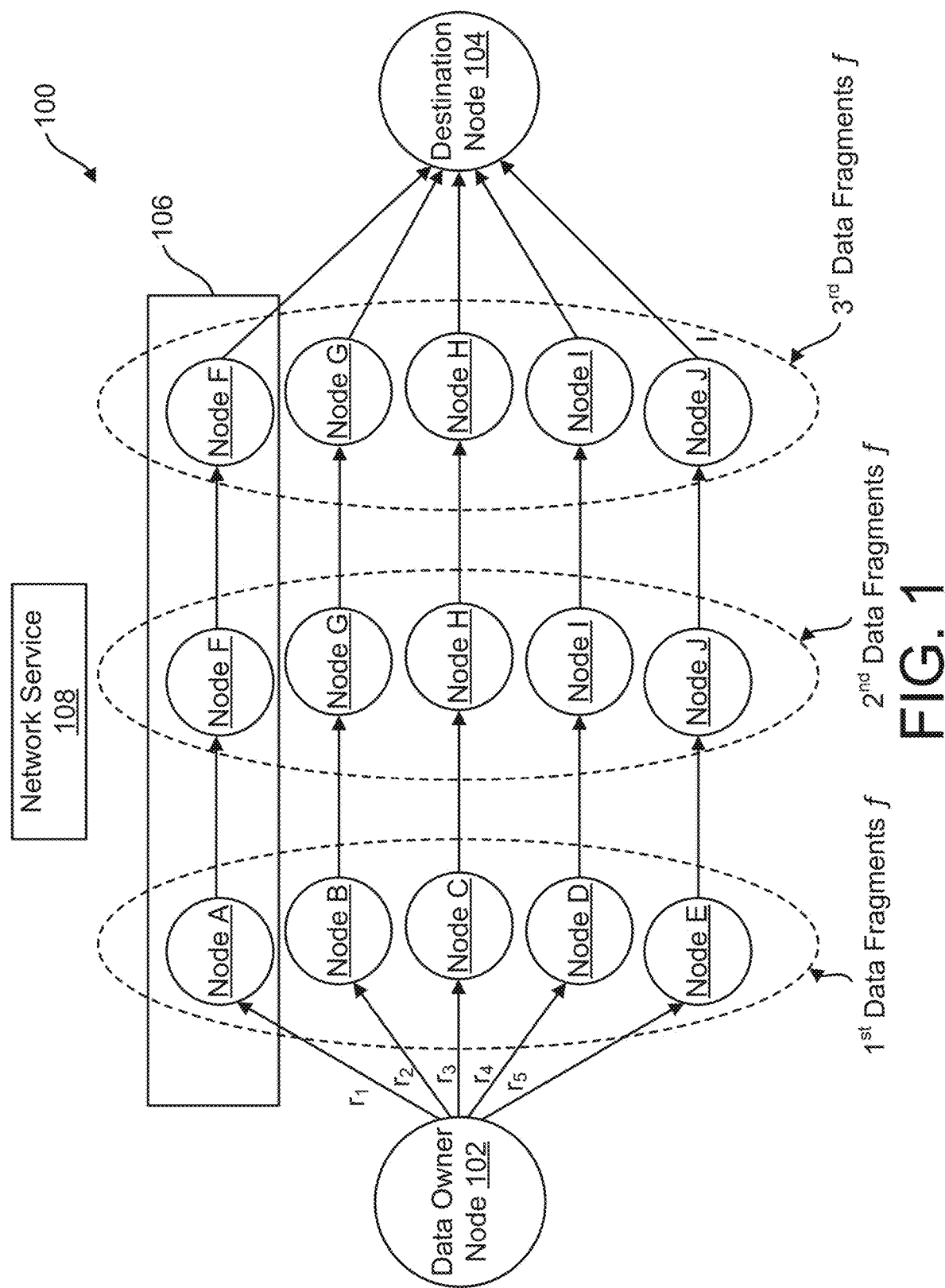
FIG. 1 illustrates a high-level overview of a Distributed Permissioned Data (DPD) network in accordance with implementations of the present disclosure.

The present disclosure provides a description of a system architecture to securely store data by distributing multiple copies of data fragments in resilient nodes on a network. Such a network of connected nodes is called a "Distributed Permissioned Data" (DPD) network herein. With reference to FIG. 1, there is illustrated a high-level overview of the DPD network 100. Data may be submitted by a data owner node 102 or generated internally within the data owner node 102 for storage in the DPD network 100. Submitted data can be unencrypted or encrypted prior to reception. If encrypted, the decryption key for the data should preferably be stored on an alternate system (e.g., a server) or within the DPD network 100 as a separate data string, as described below. A destination node 104 (or multiple destination nodes) is the target where a completed data payload is to be delivered once reconstituted from the DPD network 100. The destination node ID (or node IDs) may be stored in a blockchain (not shown in FIG. 1), therefore binding trust between the DPD and the immutable blockchain whereby even if the DPD network 100 is infiltrated the data will only be delivered to the destination node and not any other server destination. The data owner node may be the same as the destination node. The data owner node may also be the same as a data lessor node, to be discussed below.

As shown in FIG. 1, the data payload is divided into a number of fragments, f, where f is an integer value greater than one. The value of f may be a user-selectable value. FIG. 1 illustrates the data being divided into three data fragments. In accordance with another aspect, each data fragment is replicated on nodes within the DPD network 100. The number of replicas, r, is an integer value greater than one. FIG. 1 shows five replicas of each data fragment (labeled as $r_1, r_2, r_3, r_4$ and $r_5$). Each discrete path of fragments becomes a Node Chain 106. The value of r may be a user-selectable value. For example, critical data that needs to be highly available may distributed to a larger number of nodes (i.e., has a higher r value) than non-critical data. The values of f and r may be selected to strike a balance between cost, speed, security, and availability. Unlike traditional cloud storage, the DPD network 100 is optimized for highly secure small data packets and can operate across disparate cloud storage services.

A node, as used herein, is a basic computer entity having a network connection, storage, and processing capability. Each node has a unique identifier (e.g., IP Address, MAC address, a UUID, or other identifier). A node may store data fragments, initiate or perform services, read/write to the blockchain and/or pass messages within the DPD network 100. For example, a node may be one or more of servers, PCs, mobile phones, routers, wireless or content delivery network (CDN) repeaters, IoT devices, etc. In accordance with an aspect the present disclosure, each node executes application code that enables the node to listen for data on the DPD network 100 to be stored and perform operations described below.

As will be described below, nodes declare to a network service 108 their availability for receiving new data fragments. Each node may contain storage for data that originated at that node, a unique hash for each data string that originated at the node, a database containing the node IDs for one, or some, or all of the data fragments that one or more subsequent data fragments are distributed on, storage for data fragments that are replicated on the node, network management information, and/or temporary storage cache for messages that are in transit to be purged after each message is passed on. Any node can act as a data owner node, a data lessor node, or as a destination node. The system can also be configured so that a data owner node is dedicated to one or more data owners and that a data lessor node is dedicated to one or more data lessors. In some cases, data owner nodes can be the same node as data lessor nodes, and also in some cases, data owner nodes and/or data lessor nodes can be the same as destination nodes.

The DPD network 100 may run checks to make sure nodes are online and available to reconstitute the data and that the data payload is not corrupted. This may be performed using a check data operation on the DPD network 100.

The DPD network 100 may use one or more central network services (e.g., the network service 108) to manage nodes, optimize network traffic, initiate and manage PUT requests, initiate and manage GET requests, translate node IDs into IP addresses, store network routing information, store transaction identifiers, and communicate with the blockchain or distributed ledger. Network services may be provisioned on one or more servers or other computing architecture including in the DPD network itself. The network service 108 may be configured to be accessible by all nodes and provide translation of node IDs to IP Addresses, the node ID for the first node in each node chain 106, network management and other functions to manage the DPD network 100.

Writing Data Fragments to the DPD Network

Figure 2A:
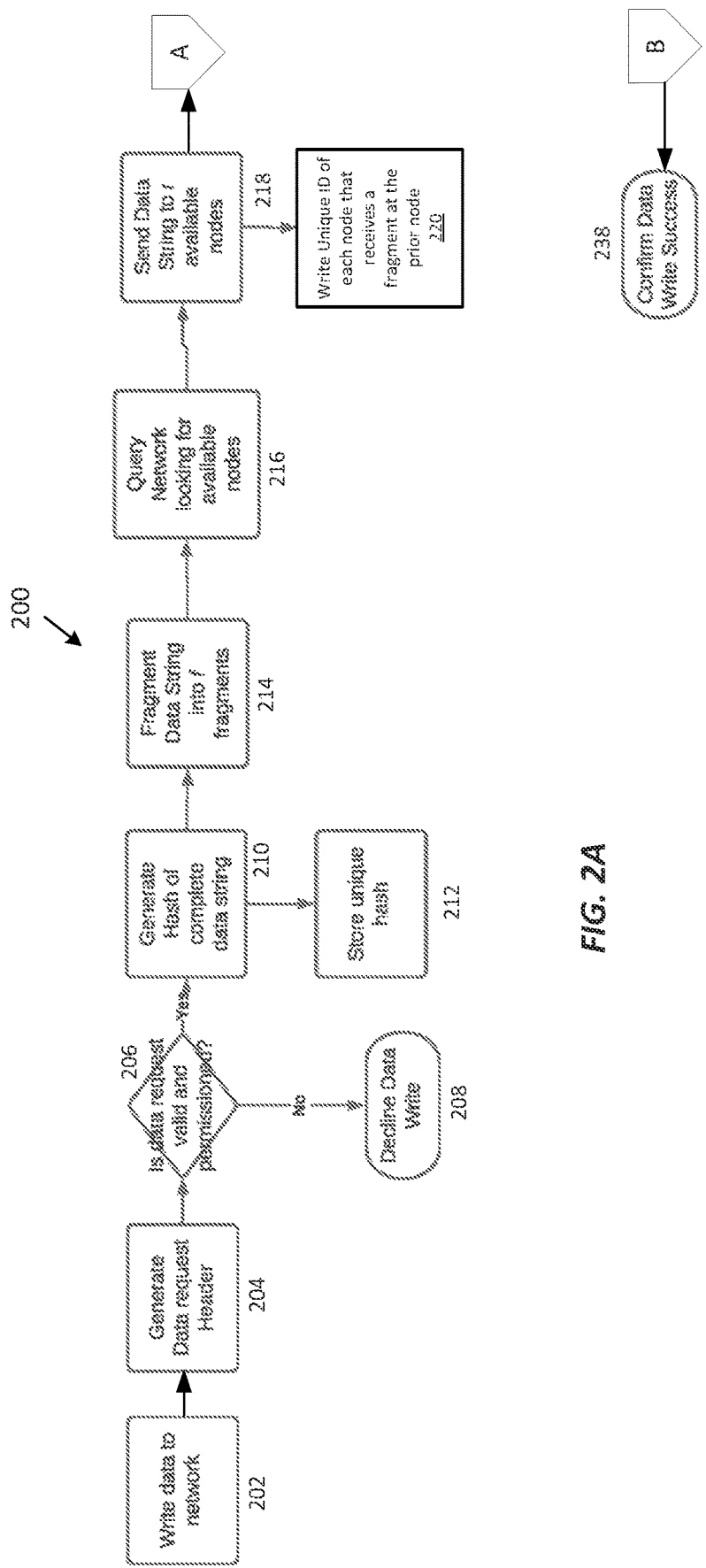
FIGS. 2A-2B illustrate an operational flow of example processes performed to write data to the DPD network in accordance with implementations of the present disclosure.
Figure 2B:
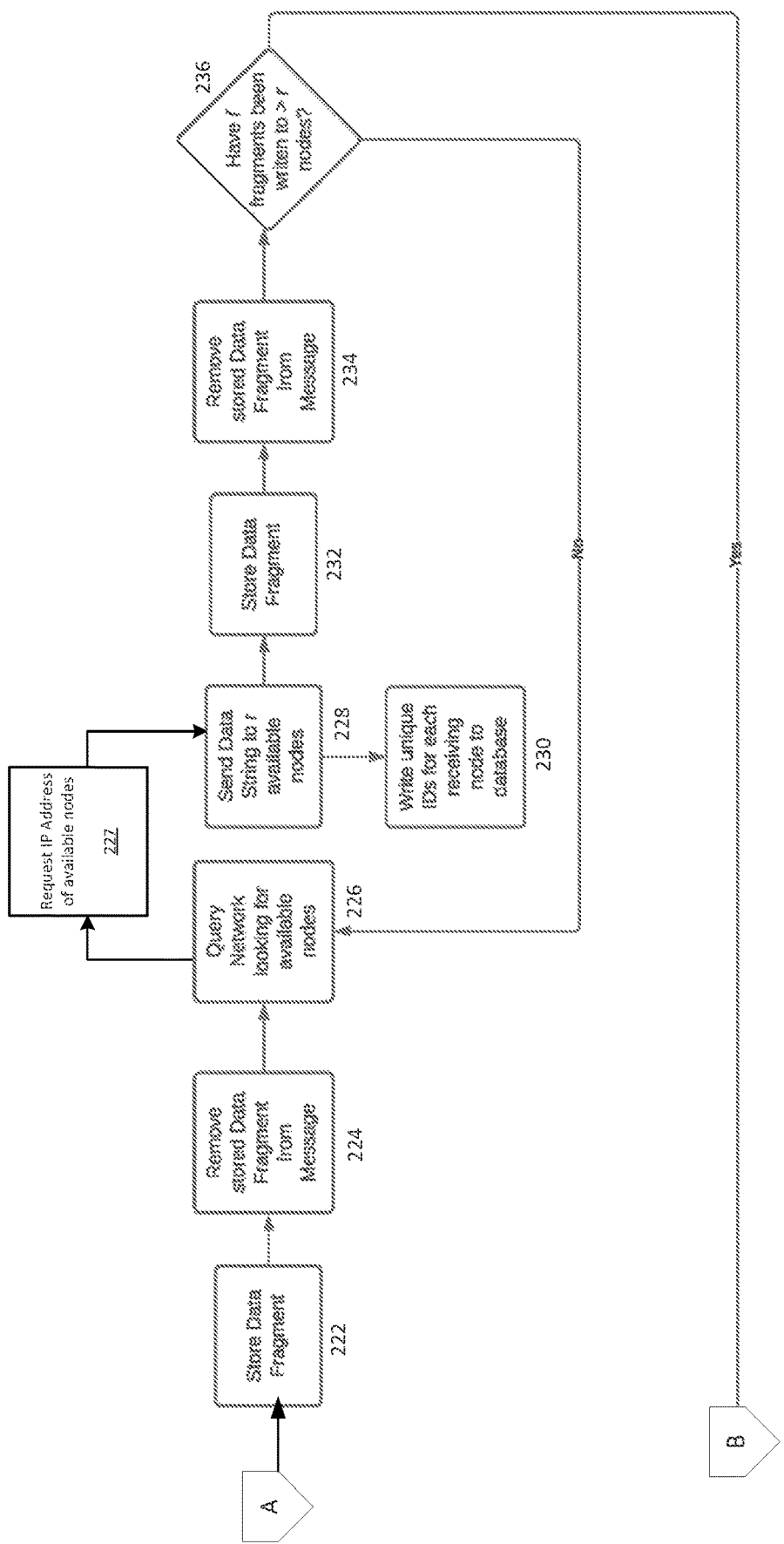
Figure 3:
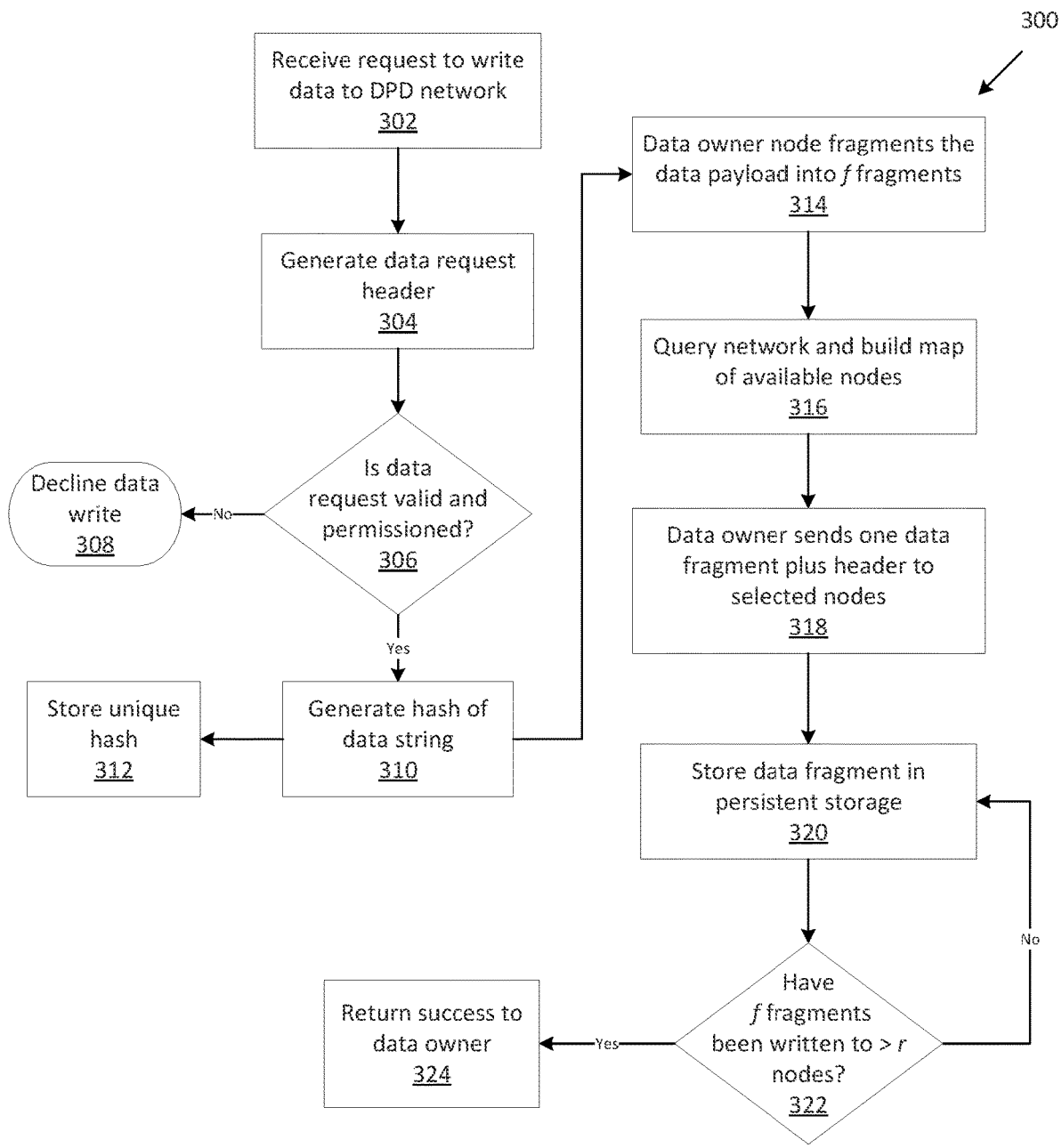
FIG. 3 illustrates an alternative operational flow of example processes to write data strings into the DPD network in accordance with implementations of the present disclosure.
Figure 4:
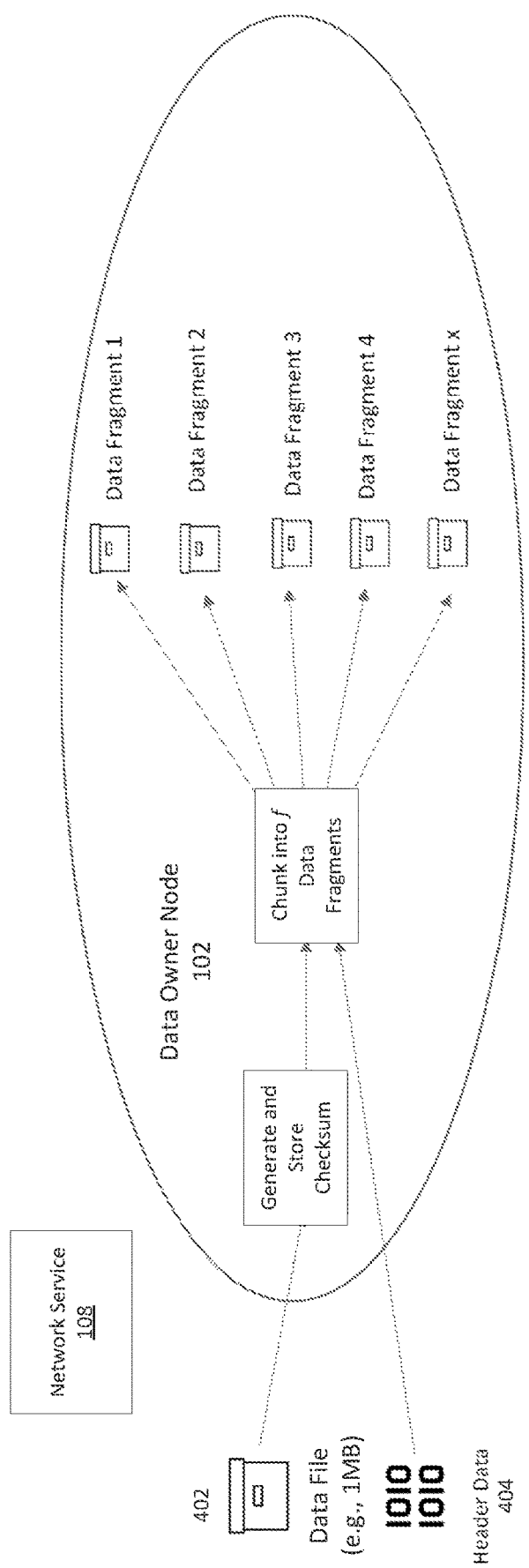
FIGS. 4-5 illustrate aspects of the relationships among nodes, data fragments and replicas in the DPD network in accordance with implementations of the present disclosure.

With reference to FIGS. 2A, 2B, and 3-5, a process 200 of writing data to the DPD network 100 will now be described. Referring to FIG. 2A, operational processes 202-220 and 238 take place at the data owner node 102. The data owner node 102 is the start of a DPD network 100. At 202, a request is received to write data to the DPD network 100. As shown in FIG. 4, a source file 402 is received by the data owner node 102 from an external source or from within the data owner node itself (not shown). In an implementation, the source payload provided to, or originating within, the data owner node can be encrypted. The DPD network 100 does not have the key and is unable to decrypt the data. In another implementation, an encryption key for a file submitted to the DPD may also be written to the DPD as a separate transaction to provide additional resiliency.

At 204, a data request header is generated. The header data 404 is provided to the data owner node 102 and used when dividing the source payload into fragments. At 206, it is determined if the data request is valid and has the proper permissions. If not, then at 208 the request to write data to the DPD network is declined. If the request at 206 is valid and has proper permissions, then at 210, a checksum or unique hash of the complete data string is generated at the data owner node where, at 212, it is stored at the network service 108. Alternatively, the checksum may be stored in the blockchain or the data owner node. The checksum is accessed to confirm a successful PUT request and to confirm the integrity of the data in a GET request. As used herein, a data payload is the complete encrypted or unencrypted data to be deposited in the DPD network 100 and may include, but is not limited to, messages, strings, database records, files and all other forms of information that can be stored, sent or received on the DPD network 100. The data payload has a size, s.

At 214, the data payload is fragmented into f fragments. As noted above, f is a configurable value greater than one and each fragment is preferably equal in size. At 216, the data owner node queries the network services for available nodes, and a random selection of node IDs numbering f, f*2, or more are returned to the data owner node. With reference to FIG. 4, the data owner node 102 randomly selects f number of suggested and available nodes on the network (e.g., node A, node B, node C, node D and node E, etc.).

At 218 data is sent to r available nodes, where r represents the number of replicas of each fragment to be written to the DPD network. In performing operations 214-218, a Put Header File is created for each data string that may contain the following non-limiting parameters:

Size of the total data string ("s");

Number of fragments, f, the data should be divided in to; and

Number of replicas, r, of each data fragment that should be maintained on the DPD network.

For example, a 1 MB source file 402 could be divided into 5 data fragments of 200 kB each with 10 copies of each fragment to be saved on the DPD network for resilience. As such, s=1 MB, f=5, and r=10. In this example, saving the 1 MB source file to the DPD network 100 would result in a total of 10 MB (s*r) stored including replicas, across a total of 50 nodes (f*r).

Figure 5:
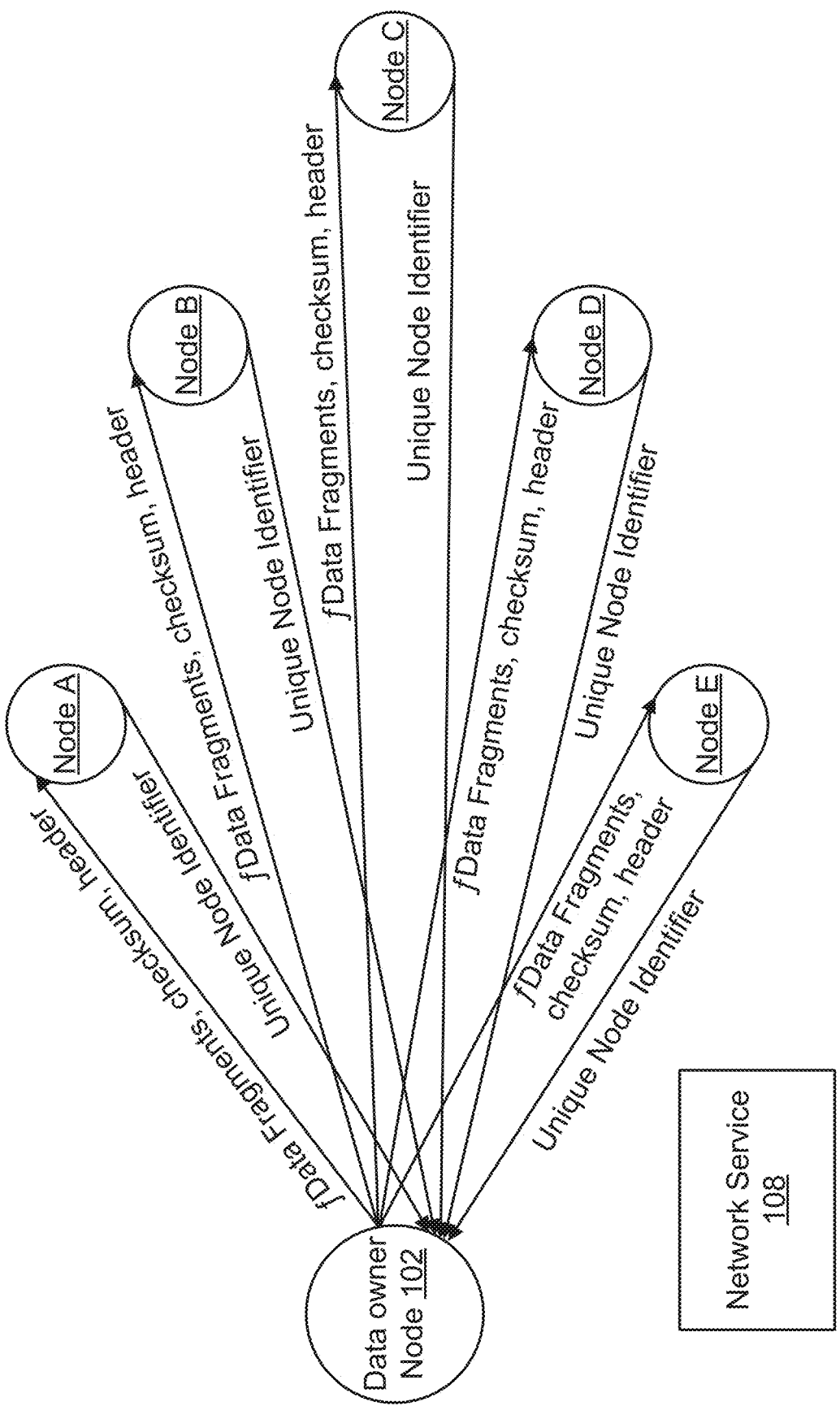

At 220, the unique ID of each node that receives a fragment is written to a database at the prior node in the chain. The node IDs of the first nodes in replica may also be maintained within the data owner node 102 so it can initiate the retrieval of the data from the fragments stored on the various nodes in the network (see, e.g., FIGS. 6, 7 and 8). It may also be housed in a separate network service With reference to FIG. 2B, operations 222-236 take place at randomly selected downstream nodes from the data owner node in the DPD network 100. These operations may be performed by any node receiving data fragments associated with the source data 402 to be written to the DPD network (i.e., Nodes A-E, etc.). At 222, a message is received from the data owner node to store the data fragment. As shown in FIG. 5, the message may include all f data fragments and the Put Header. As described at 220, the receiving node sends its unique node identifier to the previous node in the chain, where it is stored. When a receiving node is willing and able to receive a data fragment it returns to data owner node that it is available.

At 224, the data fragment is removed from the data payload. The removed fragment is stored at the receiving node in persistent storage. At 226, the node then queries the DPD network service 108 looking for other available nodes in which to store replicas of the fragment. At 227, the node requests the IP address(es) of the available nodes identified by the DPD network service 108.

At 228, data fragment is then communicated to each of the r available notes and the unique IDs for the nodes is written to the database at 230. At 232, the replicas of that data fragment are stored. For example, as shown in FIG. 1, Node C may be the downstream node that stores the first data fragment in its storage (e.g., hard drive, solid state media or other non-volatile media). After storing the fragment, the node amends the header data to change f to f−1 as it is communicated to the next node in the chain. The data message therefore, becomes successfully shorter as fragments are deposited at nodes along the chain.

At 234, the stored data fragment is removed from the message by the next node. Here, the sending node retains one data fragment and passes the remaining data fragments and the modified put header to the next receiving node. As shown in FIG. 1, the next node may be Node H. Node C will then write Node H's unique ID onto its internal database as it is the receiving node. As such each node retains a data fragment and a map to the next node in a chain, but not the nodes two steps down the chain. At 236, it is determined if f fragments have been written to more than r nodes. If not, the process returns to step 226 to query the DPD network for additional available nodes in which to store additional replicas of the fragment f. Thus, the processes are performed r number of times until the data fragments have all been replicated to different nodes on the network.

If, at 236, f fragments have been written to greater than r nodes, then the process returns with a confirmation of a data write success to the data owner node at 238. When all data fragments have been written, the last nodes in the chain send a message to the data owner node (unique ID of which is contained within the Put Header) confirming that it has successfully received all data. When data owner node receives messages from r number of nodes that have all received the final data fragments, it may write to a distributed ledger that file put operations completed successfully. It may delete the original data payload.

An alternate example method of writing the data string into the DPD network will be described with reference to FIG. 3, where operations 302-312 take place at randomly selected downstream nodes from the data owner node in the DPD network. These operations may be performed by any node receiving data fragments associated with the source data 402 to be written to the DPD network (i.e., Nodes A-E, etc.).

At 302, a request is received to write data to the DPD network 100. As described above, the source payload provided to, or originating within, the data owner node can be encrypted and the DPD network 100 does not have the key and is unable to decrypt the data. Similarly, the encryption key for a file submitted to the DPD may also be written to the DPD as a separate transaction to provide additional resiliency.

At 304, a data request header is generated. The header data 404 is provided to the data owner node 102 and used when dividing the source payload into fragments. At 306, it is determined if the data request is valid and has the proper permissions. If not, then at 308 the request to write data to the DPD network is declined. If the request at 306 is valid and has proper permissions, then at 310, a checksum or unique hash of the complete data string is generated at the data owner node where, at 312, it is stored at the network service 108. Alternatively, the checksum may be stored in the blockchain or the data owner node. The checksum is accessed to confirm a successful PUT request and to confirm the integrity of the data in a GET request.

At 314, the data owner node fragments the data payload into f fragments itself. It then randomly selects r nodes from the available DPD network to act as first nodes in the chain. Those nodes then randomly select subsequent nodes in the chain until f number of nodes have been randomly selected forming a node chain with each node writing the subsequent receiving node in its own database and sending a message back to the data owner node of all the nodes that require a fragment. At 316, the data owner node queries the network services for available nodes, and a random selection of node IDs numbering f, f*2, or more are returned to the data owner node. The data owner node also builds a map of available nodes from this information. With reference to FIG. 4, the data owner node 102 randomly selects f number of suggested and available nodes on the network (e.g., node A, node B, node C, node D and node E, etc.).

At 318, the data owner node then sends one data fragment plus the header data to each of the nodes it has selected in one continuous data operation. At 320, the data fragment is stored at the receiving node in persistent storage.

If, at 322, f fragments have been written to greater than r nodes, then the process returns with a confirmation of a data write success to the data owner node at 324. If not, then the processing returns to 320. When all data fragments have been written the data owner node confirms that all nodes in r chains have returned an acknowledgement to the data owner node (unique ID of which is contained within the Put Header) confirming that each has successfully received its data fragment and the unique Node ID of the previous node in the chain. The data owner node may then write to a distributed ledger that file put operations completed successfully. It may delete the original data payload and the temporary copy of the network route map, so the data owner node has no knowledge of subsequent nodes in the chains.

Reading Data Fragments from the DPD Network

Figure 6:
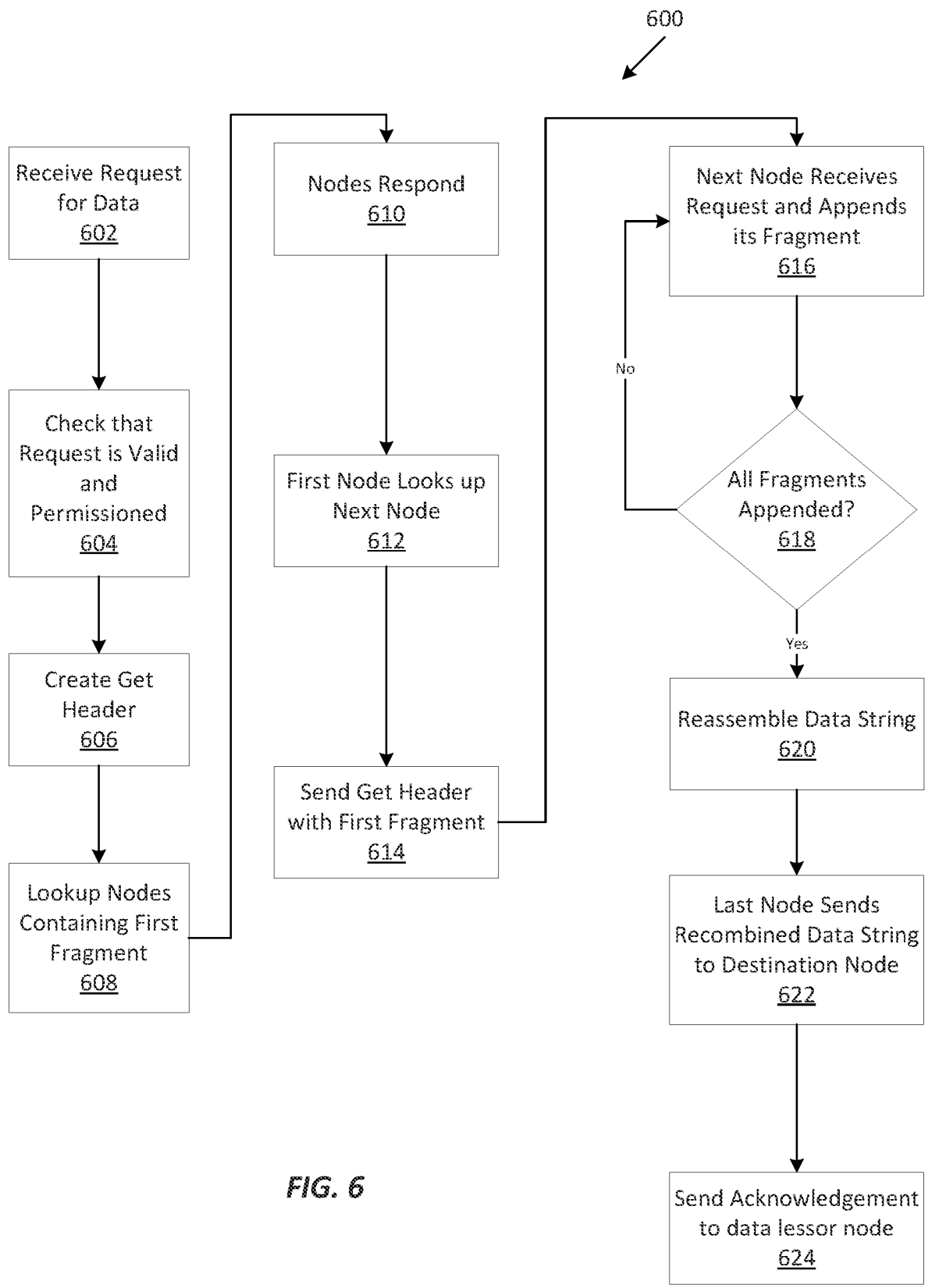
FIG. 6 illustrates an operational flow of example processes performed to read data from the DPD network in accordance with implementations of the present disclosure.

With reference to FIG. 6, there is illustrated an example process 600 that is performed to read data from the DPD network 100. At 602, a request for data (a Get Request) is received. The Get Request includes information to read a data file from the DPD network. At 604, the DPD network checks that the request is valid and permissioned. For example, this may be validated by a smart contract or distributed ledger, such as a blockchain. At 606, a Get header is created by the data lessor node.

At 608, the data lessor node consults the database of nodes that it knows contains the first data fragments (r number of nodes), or requests from the network service the node IDs for the nodes that contains the first data fragments, and pings all of them with a message requesting that the data be reassembled and a Get Header that includes:

The data lessor node unique identifier; and
The delivery node unique identifier.

At 610, the nodes that are able to respond (i.e., are online, with available network bandwidth and access to their storage) receive incoming responses and retrieve the first data fragment. At 612, those nodes then consult their own internal database to lookup the next node in its chain that contains the second data fragments. At 614, the first nodes send the Get Header plus the first data fragment to the next node. At 616, each receiving device that is on and connected, receives the incoming request and appends its part of the fragmented data payload and the Get Header on to the next r nodes which contain additional fragments. Thus, each node only knows the address of the subsequent node that contain additional fragments.

At 618, it is determined if all the distributed data fragments are at the last node. If not, then the process returns to 616 for the next node to add its data fragment. If so at 622, then at 620, the DPD network reassembles the data fragments by reversing the network look up performed in the write operations 200. Instead of the data payload becoming smaller at each next wave of nodes, the payload size increases until the entire data payload is reassembled. At 622, the last node in each chain recombines the data fragments into the complete data payload, generates a hash of the reconstituted data payload, and sends the hash to the data lessor node to confirm the reconstituted data payload is the exact same as the original file. The data lessor node identifier may be contained in the Get Header header or provided by a network service or embedded in the blockchain. At 624, an acknowledgement is sent from the last node to the data lessor node.

Figure 7:
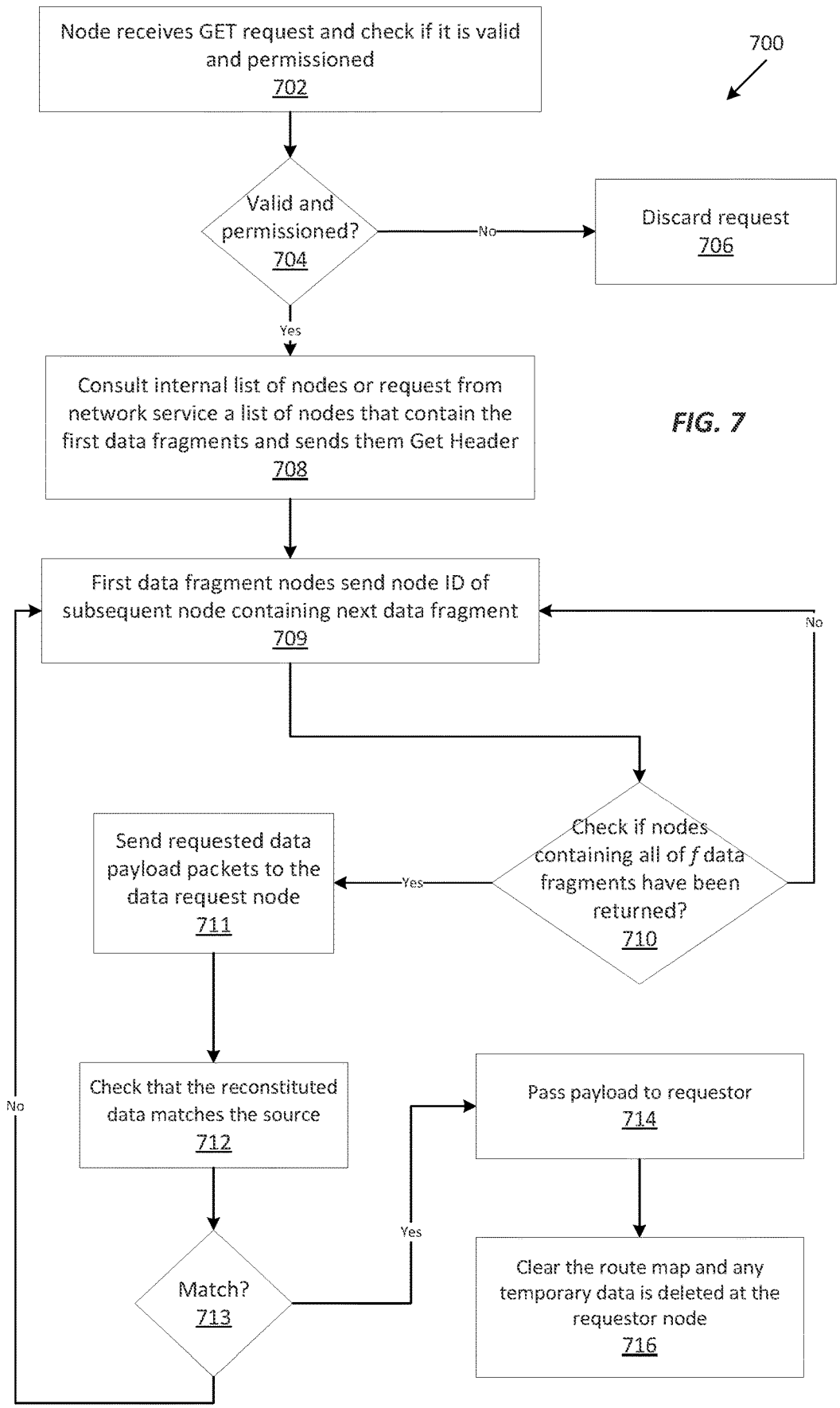
FIGS. 7 and 8 illustrate operational flows of alternative example processes to reading data from the DPD network in accordance with implementations of the present disclosure.

An example alternate method 700 of reading the data payload into the DPD network will be described with reference to FIG. 7. At 702, the data owner node (or other node in the DPD network 100) receives a Get request and checks at 704 that the request is a valid and permissioned Get request by consulting the blockchain. If, at 704, it is determined that the request is not valid and/or not permissioned, then the request is discarded at 706. If the request is valid, then at 708, the data owner node consults a list of nodes contained in the data owner node or the network service 108 that contain the first data fragments and sends them the Get Header noted above. At 709, each first data fragment node in each Node Chain 106 sends its unique Node ID back to the Data Owner Node (or other node) which rebuilds the map of where each data fragment has been stored. To perform the rebuild operation, the data owner node consults the first fragment node to find the node IDs of the next node in the chain. Then it consults that next node for its next node, and so on, until the network map is rebuilt. When the Data Owner Node can rebuild any complete Node Chain (off data fragments), then it requests each of those nodes send their data fragments simultaneously back to the Data Owner Node which reconstitutes the original data payload.

At 710, it is determined if the nodes containing all of the f data fragments have been returned. If not, the operational flow returns to 709. If yes, then at 711, the requested data payload packets is sent to the data request node. At 712, the Data Owner Node (or other node) checks that the reconstituted data exactly matches the source by comparing the check sum of the original and reconstituted data. If, at 713, the two checks do not match, it can request the copy from another Node Chain at 709. If, at 713, the two checks match, then at 714, the Data Owner Node can then pass the entire data payload to the Data Lessor Node or other Destination Node as noted in the original Get request. Additionally or optionally, at 716, the Data Owner Node then may delete the original data payload and the temporary copy of the network route map, so the Data Owner Node has no knowledge of subsequent nodes in the chains.

Figure 8:
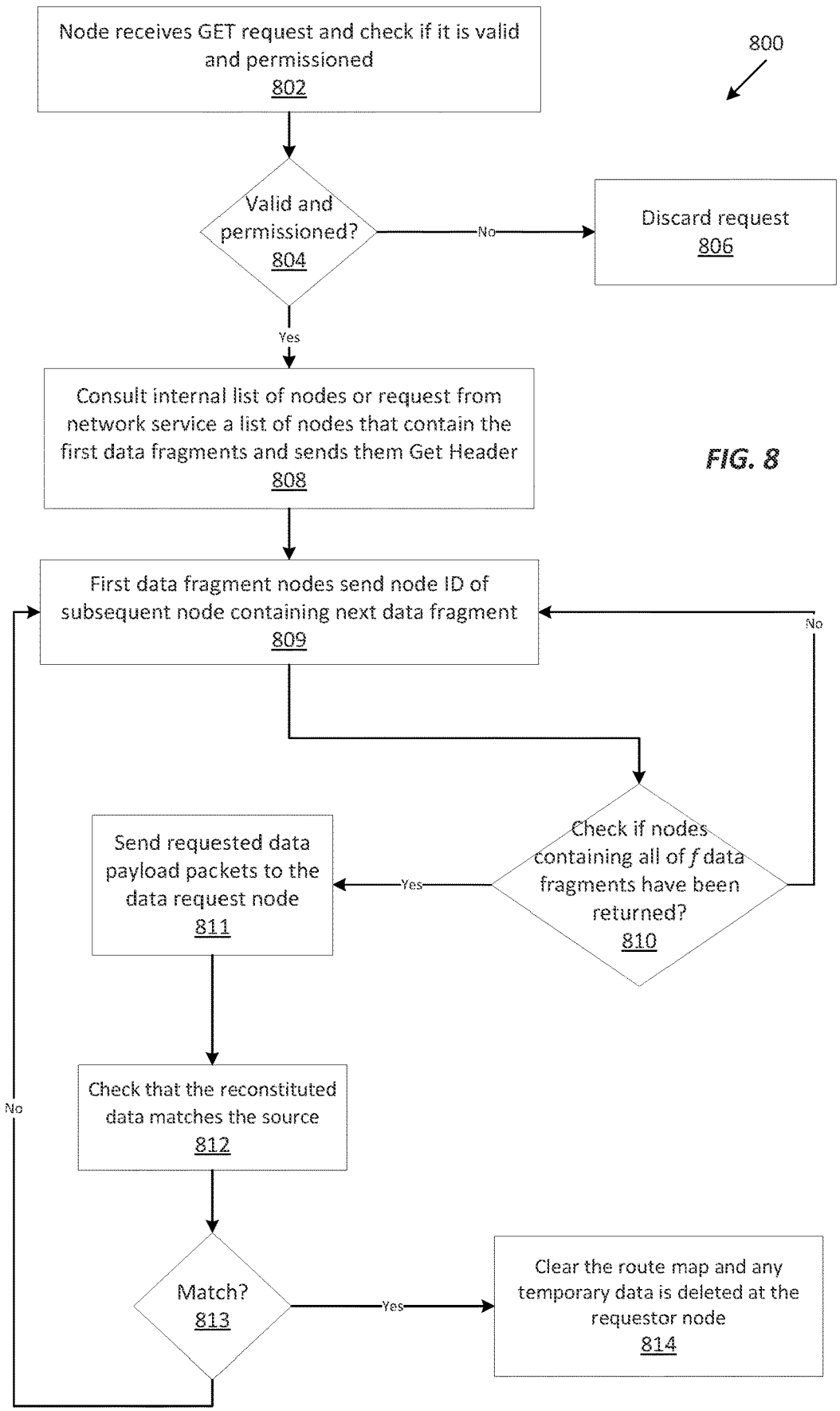

A second example alternate method 800 of reading the data payload into the DPD network will be described with reference to FIG. 8. In the method 800, the requested data is sent directly to the data requester node. At 802, the data owner node (or other node in the DPD network 100) receives a Get request and checks at 804 that the request is a valid and permissioned Get request by consulting the blockchain. If, at 804, it is determined that the request is not valid and/or not permissioned, then the request is discarded at 806. If the request is valid, then at 808, the data owner node consults a list of nodes contained in the data owner node or the network service 108 that contain the first data fragments and sends them the Get Header noted above. At 809, each first data fragment node in each Node Chain 106 sends its unique Node ID back to the Data Owner Node (or other node) which rebuilds and temporarily stores the map of where each data fragment has been stored. To perform the rebuild operation, the data owner node consults the first fragment node to find the node IDs of the next node in the chain. Then it consults that next node for its next node, and so on, until the network map is rebuilt. When the Data Owner Node can rebuild any complete Node Chain (off data fragments), then it requests each of those nodes send their data fragments simultaneously back to the Data Owner Node which reconstitutes the original data payload.

At 810, it is determined if the nodes containing all of the f data fragments have been returned. If not, the operational flow returns to 809. If yes, then at 811, the requested data payload packets is sent to the data request node. At 812, the Data Owner Node (or other node) checks that the reconstituted data exactly matches the source by comparing the check sum of the original and reconstituted data. If, at 813, the two checks do not match, it can request the copy from another Node Chain at 809. If, at 813, the two checks match, then at 814, the Data Owner Node then may delete the original data payload and the temporary copy of the network route map, so the Data Owner Node has no knowledge of subsequent nodes in the chains.

Validating Data Integrity

As noted above, the DPD network may conduct data validity checks. When a request for a data check is received by the network at a data owner node, a data lessor node, or network service location, the Check Data request may include the r number of data fragments expected to be seen. The requesting node or network service location checks that the request is valid and permissioned (for example validated by a smart contract or distributed ledger such as a blockchain) and creates an entry in the ledger that the data has been requested to be validated and by whom. The requesting node or network service location consults the database of nodes that it knows contains the first data fragments and pings all of them with a message requesting that the data be reassembled and a header that includes the requesting node or network service location unique identifier.

The nodes that are able to respond (online, with available network bandwidth and access to their storage) receives incoming response and retrieves the first encrypted data fragment. Those nodes then consult their own internal database for nodes that contain subsequent data fragments. The last nodes in the node chains that have received all the data fragments then reconstitute the fragments into a total data string, generate a hash of the data string, and send the hash to the requesting node or network service location (the ID for which is included in the header file).

The requesting node or network service location compares the incoming data hashes from all of the last nodes to the original hash created before the data write. The requesting node or network service location can then count the number of accurate copies it has received and log any copies that do not match the hash. If the number of complete copies back from the network is <r, additional copies can be requested by writing new data chains to ensure the number of copies is always greater than r. All reconstituted temporary copies of the data payload are erased from network service or requesting nodes for security purposes.

Deleting Data

To delete data from the DPD network, a distributed ledger (e.g., blockchain) entry is created to indicate that the data payload is to be cancelled. A data owner node sends a message to all nodes in each node chain, using the same methodology described above, asking the nodes to delete their respective saved fragment of the data string from its persistent storage. The last node in each chain sends a message back to the data owner node confirming that the data fragments that comprise the data payload have been deleted from the DPD network.

Example Use Cases

In the enterprise, the following may be use cases of the DPD network:
- Personally Identifiable Information (PII) for any consumer data that organizations don't want to hold liability for by maintaining on their infrastructure. This data may be stored in its entirety as one data string or as individual fields (e.g., first name, last name, date of birth, etc.) such that individual fields can be retrieved by the DPD network.
- Other critical, secure, regulated enterprise data such as HR records (payroll, health records), finance transactions/ledgers, IP, patents, copyrighted and trade secrets, identity, passwords, legal agreements, creative work, computer source code etc.
- Encryption keys for data stored on other services (for example public keys, private keys, DRM encryption keys) for cloud-based storage services
- Secure, permissioned sharing of data between users within the organization or externally via precise permissions on the blockchain and data stored on the DPD.
- Point to point or point to multi-point communication where a message or file is passed through the DPD network and purged after receipt from the destination node—encrypted data networks for super private messages
- Cloud based sharing of secure data between devices/servers on a network
- Delivering digital copies of products (for example a marketplace for music, video, games, software applications) the files of which could be duplicated across the DPD network. The permissions could be allocated to any number of validated users that could install local copies of DPD encrypted files with the blockchain providing ongoing validation of their permissions.

Consumer use cases of the DPD network may be as follows:
- Data for high security such as, but not limited to, a Digital wallet to contain secure card information, education history, certificates and proof of ownership, identity, and other government records, genetic information, personal passwords, personal documents (insurance documents, scanned personal documents such as passports, etc.)
- A distributed ledger requiring neither proof-of-work or proof-of-stake for tracking transactions, digital currencies, NFTs. The DPD network provides environmental and speed/efficiency benefits over using a traditional blockchain.
- Peer to per securities/commodities transactions (fractional or whole)
- Point to point or point to multi-point communication where a message or file is passed through the DPD network and purged after receipt from the destination node—encrypted data networks for super private messages Thus, the system architecture described herein solves many limitations in the art, including, but not limited to the secure, distributed robust storage of small data payloads.

Figure 9:
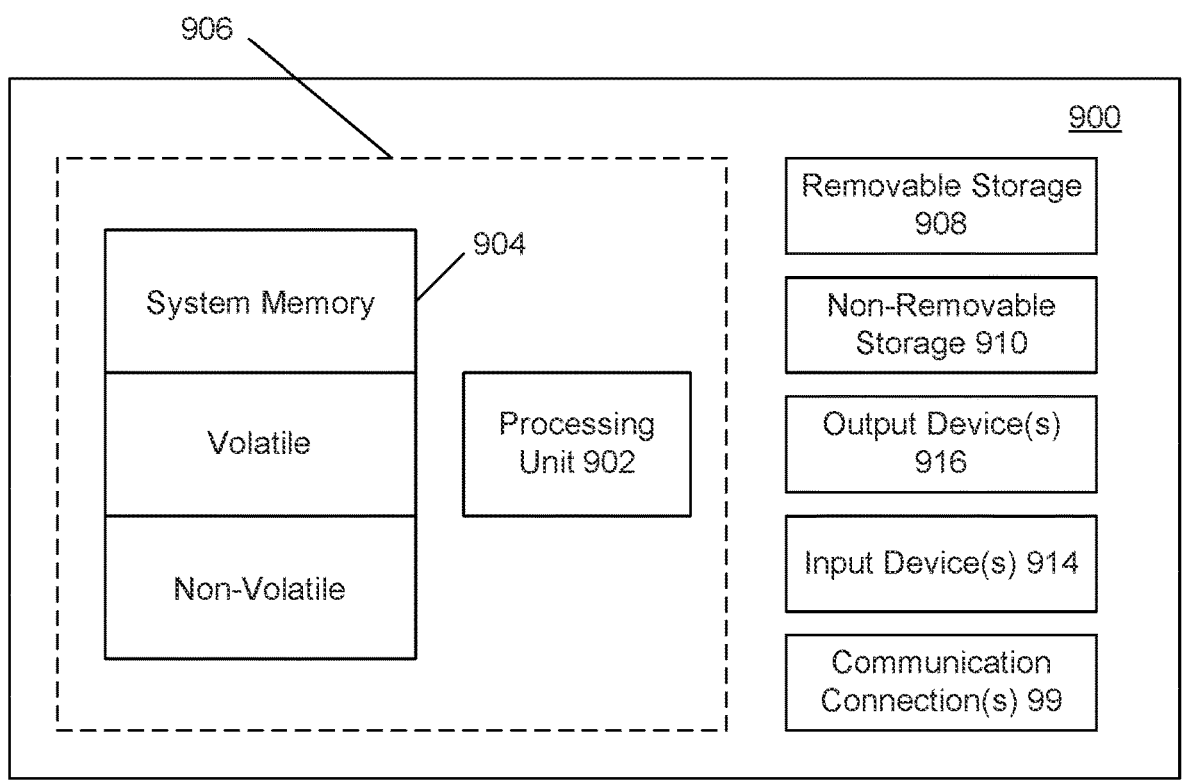
FIG. 9 illustrates an example computing environment.

FIG. 9 shows an example, non-limiting, computing environment in which example embodiments and aspects may be implemented. The computing environment is only one example of a suitable computing environment and is not intended to suggest any limitation as to the scope of use or functionality.

Numerous other general purpose or special purpose computing devices environments or configurations may be used, such as, but not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include tangible volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

In one or more implementations, the operational flows of FIGS. 2A, 2B, 6, 7 and 8 may be implemented in a computing environment such as that shown in FIG. 9. Further, the complex numerical computations to determine the unique hashes, the storage of data fragments, and other data operations described herein may be performed in a computing environment such as that shown in FIG. 9.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, IoT and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of storing data in a distributed permissioned data (DPD) network, comprising: receiving, at a data owner node, a request to write a data string to the DPD network; verifying if the request is permissioned to write to the DPD network using information registered in a distributed ledger stored on nodes other than the data owner node; and if the request is permissioned; dividing the data string into f data fragments, wherein f is greater than 1; querying DPD network services for available nodes to which the data fragments are to be saved; receiving a message at first available node that includes all f data fragments, a checksum and a Put Header; sending a unique node identifier of the first available node to the data owner node; querying, by the first node, available nodes in which to store replicas of the data fragments f; communicating the data fragments f to each of the available nodes; and confirming all data fragments f have been written to the DPD network; and if the request is not permissioned, denying the request.

2. The method of claim 1, wherein the data string is associated with a source file, and wherein the source file is encrypted.

3. The method of claim 2, wherein the DPD network does not have a decryption key associated with the encrypted source file.

4. The method of claim 1, further comprising:
providing a data request header to the data owner node; and
using the data request header when dividing the data string into fragments.

5. The method of claim 1, further comprising generating a checksum of complete data string.

6. The method of claim 1, wherein the data string has a size, s.

7. The method of claim 1, wherein, f is a configurable value greater than one, and wherein each fragment is equal in size.

8. The method of claim 1, wherein the data fragments are sent to r available nodes, wherein r represents a number of replicas of each fragment to be written to the DPD network.

9. The method of claim 8, further comprising generating a Put Header File is created for each data string that contains the following parameters:
a size of a total data string ("s");
a number of fragments, f, the data should be divided in to; and
a number of replicas, r, of each data fragment that is maintained on the DPD network.

10. The method of claim 1, further comprising saving unique IDs of each node that
receives a fragment in a database at the data owner node or in the DPD network services.

11. The method of claim 1, further comprising, sending a message, by last nodes in the chain, confirming that it has successfully received all data.

12. The method of claim 1, further comprising writing, by the data owner node to a distributed ledger that file write operations completed successfully.

13. The method of claim 1, writing the DPD network services data to the DPD network.

14. The method of claim 1, the communicating the data fragments f to each of the available nodes further comprising:
removing a first data fragment from the message and storing a first data fragment of the data fragments f at the first available node; and
repeating for each next available node in a node chain:
sending the message to a next available node that includes all f-1 data fragments, a checksum and the Put Header;
sending a unique node identifier of the next available node to a previous node;
removing a next data fragment from the message and storing the next data fragment at the first available node;
querying, by the next node, further available nodes in which to store replicas of the next fragment and communicating the next data fragment to each of the next available nodes; and
amending Put Header data to subtract 1 from f data fragments.

15. A method of reading data from a distributed permissioned data (DPD) network, comprising: receiving a request at a data lessor node to read a data string from the DPD network; verifying if the request is permissioned to read from the DPD network using information registered in a distributed ledger stored on nodes other than the data owner node, and if the request is permissioned; reassembling the data string by: consulting, by the data lessor node, a database of first nodes that contain a first data fragment of the data string; forwarding, by the data lessor node, to at least one first node, a message and a Get Header that includes a data lessor node unique identifier and a delivery node unique identifier; consulting, by the at least one first node, an internal database to lookup next nodes that contains next data fragments; forwarding, by the at least one first node, to at least one next node, the message, the first data fragment and the Get Header; determining if the last data fragment has been read, and if not, repeating the consulting and forwarding until all data fragments of the data string have been read, or if so, recombining the data fragments into the data string; and if the request is not permissioned, denying the request.

16. The method of claim 15, further comprising:
creating a ledger entry that the data has been requested and by whom.

17. The method of claim 15, further comprising decrypting the data string using a decryption key held by the requester.

18. The method of claim 15, wherein the request includes a unique node unique identifier for a destination node where the data string is to be delivered.

19. The method of claim 15, wherein each node only knows an address of the subsequent node that contain additional fragments.

20. The method of claim 15, further comprising:
generating, at a last node, a hash of the recombined data string, and
sending the hash to the requesting node or DPD network services to confirm a recombined data string is the same as the original file.

21. The method of claim 15, reading DPD network services data from the DPD network.

\* \* \* \* \*